United States Patent
Verma

(10) Patent No.: US 6,757,299 B1
(45) Date of Patent: Jun. 29, 2004

(54) PEAK POWER TO AVERAGE POWER RATIO REDUCTION IN MULTICARRIER COMMUNICATION SYSTEMS USING ERROR-CORRECTING CODE

(75) Inventor: Amit Verma, Malabar Hill (IN)

(73) Assignee: Silicon Automation Systems Limited, Bangalore (IN)

(*) Notice: Subject to any disclaimer, the term of this patent is extended or adjusted under 35 U.S.C. 154(b) by 0 days.

(21) Appl. No.: 09/401,073

(22) Filed: Sep. 22, 1999

Related U.S. Application Data

(60) Provisional application No. 60/101,746, filed on Sep. 24, 1998.

(51) Int. Cl.[7] .................................................. H04J 1/08
(52) U.S. Cl. ...................................... 370/482; 370/343
(58) Field of Search ................................ 370/482, 480, 370/280, 281, 294, 252, 204, 321, 332, 343, 344, 347, 318, 324, 350, 488; 375/227, 284, 285, 247, 296, 301, 303, 215

(56) References Cited

U.S. PATENT DOCUMENTS

| | | | | |
|---|---|---|---|---|
| 5,255,257 A | * | 10/1993 | Bryant et al. | 369/121 |
| 5,302,914 A | * | 4/1994 | Arntz et al. | 330/129 |
| 5,349,300 A | * | 9/1994 | Matz et al. | 330/129 |
| 5,790,555 A | * | 8/1998 | Narahashi et al. | 370/480 |
| 5,838,732 A | * | 11/1998 | Carney | 375/297 |
| 5,854,571 A | * | 12/1998 | Pinckley et al. | 330/129 |
| 6,424,681 B1 | * | 7/2002 | Tellado et al. | 375/296 |
| 6,445,747 B1 | * | 9/2002 | Jafarkhani et al. | 375/285 |

OTHER PUBLICATIONS

Bingham, "Multicarrier Modulation for Data Transmission," *IEEE Comm.*, vol. 28, No. 5, pp. 5–14, 5/90.
Tellado & Cioffi, "PAR Reduction in Multicarrier Transmission Systems," TIE1.4/97–367, Dec. 8, 1997.
Tellado & Cioffi, Revisiting DMT's PAR (98–083), T1E1.4/98–083, Mar. 3, 1998.
ITU Study Group 15, "A New Approach to PAR Control in DMT Systems," NF–83, May 11–14 1998.
ITU Study Group 15, "An Efficient Implementation of PAR reduction method," Aug. 3–7, 1998.
Jones, Wilkinson & Barton, "Block Coding Scheme for Reduction of Peak to Mean Envelope Power Ratio".

* cited by examiner

*Primary Examiner*—Huy D. Vu
*Assistant Examiner*—Daniel Ryman

(57) ABSTRACT

This invention pertains to multicarrier systems where the Peak power to Average power Ratio (PAR) is generally high, and where the system has a Forward Error Correction (FEC) mechanism. A peak detection mechanism, a procedure for choosing a subcarrier to be modified and a symbol modifier scheme are disclosed for lowering the peak power of a signal while minimizing coding errors. The peak detector uses a threshold for determining whether the PAR reduction is to be applied. A subcarrier symbol(s) to be modified is identified depending on the number of peaks in a frame, by determining the subcarrier symbol which has the maximum effect on the peaks in the frame. One method chooses the subcarrier with the greatest overall effect on a peak in the frame, a second method selects the subcarrier that gives the minimum sum of residual peaks, and a third method is limited to situations where there are only two peaks.

10 Claims, 4 Drawing Sheets

PEAK POWER TO AVERAGE POWER RATIO REDUCTION IN MULTICARRIER COMMUNICATION SYSTEMS USING ERROR-CORRECTING CODE

This application claims benefit of Provisional application Ser. No. 60/101,746, filed Sep. 24, 1998.

BACKGROUND OF THE INVENTION

1. Field of the Invention

This invention pertains to data communication systems that employ a multitude of carriers for conveying information through a transmission medium. In particular, this invention addresses the problem of peak to average power ratio reduction in such systems.

2. Description of the Background Art

A multicarrier transmission system is one that employs Frequency Division Multiplexed (FDM) subcarriers for transmission of data across a communication channel. A comprehensive description of multicarrier systems is given in by John A. C. Bingham in "Multicarrier Modulation for Data Transmission: An idea whose time has come", IEEE Communication Magazine, Vol. 28, No 5, pp. 5–14, May 1990.

A typical multicarrier transmission system,is depicted in FIG. 1. It shows serial data in the form of bits input to a serial to parallel converter 100, which may also frame the bits. (A frame is an ordered sequence of bits of a given size). The output of block 100 is fed to a Forward Error Correction (FEC) block 200, which adds redundant bits to facilitate correction of possible errors introduced by the transmission medium 900. The output bit frame from the encoder is mapped to symbols in the mapper 300. The frame of symbols then passes through the modulator 400. The modulation could be carried out, for instance, using Inverse Fast Fourier Transform (IFFT) and the corresponding demodulation carried out using Fast Fourier Transform (FFT). The modulated signal is converted to serial data 700 and transmitted on to the channel 900, where it suffers several impairments in addition to being corrupted by noise. At the receiver, the received data is grouped into frames by a serial to parallel converter 1000 and subsequently passed through the demodulator 1100. The demodulated symbols are converted to bits and passed through FEC decoder 1200. The data bits are obtained by passing the decoded bits through a parallel to serial converter 1300.

In practice, the data bits input to the transmitter module are independent and the symbols obtained using the bits-to-symbols mapper are also independent. Whenever the number of subcarriers is large, the modulator output magnitude tends to have a Gaussian distribution, which has an infinite peak to average power ratio. A clipper 800, which has a cutoff based on a predesignated clipping probability, is then used to limit the peak signal power that is transmitted on to the channel. The clipping probability needs to be small in order that the error introduced due to clipping is small. If the predesignated clipping probability is reduced, the peak power input to the channel increases, which may cause saturation in the subsequent amplification stages. A higher peak power requires a larger range of amplifier linearity and leads to higher cost. Thus it becomes necessary to limit the peak power transmitted on to the channel by reducing the clipping level while still maintaining a low clipping probability.

FIG. 1 shows a peak detector 500 at the output of the modulator, which activates a symbol modifier 600 whenever the magnitude of any of the modulator output samples exceeds a predesignated threshold or a set of thresholds. The threshold could be set based on the level of peak power that can be transmitted on to the channel, while the task of the symbol modifier is to modify the symbols being modulated in such a manner that the peak is reduced. Although FIG. 1 shows the symbol modifier correcting the symbols that are being modulated, it is possible to achieve the same effect by correcting the modulated samples.

The symbol modifier needs to fulfill a number of objectives:

1. The clipping probability should remain unaltered when the clipping threshold is lowered.
2. The modifications introduced in the symbols should not cause significant increase in the error rate at the receiver.
3. The symbol modifier should have a low complexity.
4. The Peak to Average power Ratio (PAR) reduction scheme should be transparent to the receiver.
5. The modifications made to the data symbols should not cause an increase in the average power.
6. The loss in data rate caused due to symbol modification should be minimal.

Most of the requirements are conflicting and it may not be possible to meet all of them at the same time. The amount of importance given to different requirements by a particular method decides the extent of PAR reduction achievable by that method.

A scheme using a pre-designated set of subcarriers to reduce the PAR is described by J. Tellado and J. Cioffi in "PAR Reduction in Multicarrier Transmission Systems (97–367)", T1E1.4/97–367 Dec. 8, 1997. The method uses an iterative procedure that aims at reducing the largest peak every iteration. A similar scheme by the same authors is detailed in "Revisiting DMT's PAR (98–083)", T1E1.4/98–083, Mar. 3, 1998. Here, an iterative procedure tries to reduce all the peaks present in each iteration. Both the methods employ a precomputed peak reduction kernel. The reduction in PAR is obtained at the expense of data carrying subcarriers. It is required that the receiver be aware of the predesignated subcarriers to be used for peak reduction.

The modulo-D scheme described in "A new approach to PAR control in DMT Systems", NF-83, ITU—T, Study Group 15, 11–14 May 1998, uses an expanded constellation in each subcarrier for PAR reduction. The method uses symbols drawn from larger constellations whenever the original modulation produces large peaks. The method results in no data rate loss. The use of larger constellations results in increased average power and higher intermodulation distortion. The receiver needs to perform a reverse operation to the transmitter action to recover the original data symbols.

A sign inversion method is specified in "An Efficient Implementation of PAR reduction method based on subset inversion", AB-061r2, ITU—T, Study Group 15, 3–7 August, 1998. The method consists of dividing the set of subcarriers into several subsets and achieving a PAR reduction by inverting the sign of the symbols in some of the subsets. The transmitter uses part of the data carrying bits to indicate to the receiver whether a sign inversion has been applied. This method requires receiver cooperation and results in some data rate loss. An error in a subset inversion indicator bit may result in wrong decoding of many of the data bits associated with that subset.

The scheme specified in "A. E. Jones, T. A. Wilkinson and S. K. Barton, Block coding scheme for reduction of peak to mean envelope power ratio of multicarrier transmission schemes, Electronic Letters, Vol. 30, No. 25 pp 2098–2099, December 1994" uses a coding scheme with an inherently low PAR. This is achieved at the expense of increase in the redundancy (extra bits added to the data carrying bits.)

SUMMARY OF THE INVENTION

This invention pertains to Peak to Average power Ratio (PAR) reduction in multicarrier communication systems that employ a Forward Error Correction (FEC) coding mechanism. A method and apparatus are provided that computes a subcarrier symbol modification that effects a reduction in PAR of the transmitted data samples. The present invention consists of a peak detection mechanism, a procedure for choosing a subcarrier and a symbol modifier scheme. The peak detector uses a threshold for determining whether the PAR reduction is to be applied. A slightly modified version using a lower sampling rate and a threshold over adjacent samples is also disclosed.

Several methods are described for choosing a subcarrier for symbol modification depending on the location(s) of the peak and the effectiveness of the symbol modification on reducing the PAR with very little loss of coding gain. Specific methods apply to single peaks, two peaks and multiple peaks. The methods for choosing the subcarriers can be applied to any PAR scheme that uses symbol modifications for reducing PAR. The symbol modifier uses the fact that subcarrier errors, introduced rarely, will have a minor effect on the coding gain of the error-correction mechanism used. A tradeoff between extent of PAR reduction and loss in coding gain can be made by modifying the threshold of the peak detector.

DETAILED DESCRIPTION OF THE PREFERRED EMBODIMENTS

In accordance with the present invention, an error correcting mechanism is used to achieve a PAR reduction in multicarrier communication systems. Most multicarrier systems employ an FEC mechanism in order to improve the data rate. For instance, the Asymmetric Digital Subscriber Line (ADSL) communication protocol specified in "ANSI T1E1.413–1995, American National Standard for Telecommunications—Network and Customer Installation Interfaces—Asymmetric Digital Subscriber Line (ADSL) Metallic Interface, August 1995" uses a Reed Solomon coding scheme for error correction. In the scheme presented the encoded data frame is modified in order to achieve a reduction in PAR with little or no loss in the coding gain. It is possible to tradeoff coding gain with the extent of PAR reduction based on the application requirements. The advantage of the present invention is that the receiver need not have the knowledge of the transmitter employing a PAR reduction mechanism. Consequently, the receiver need not perform any extra action that reverses the effect of the transmitter action for achieving PAR reduction. No subcarriers need to be specifically allocated for PAR reduction signals.

The present invention is applicable to multicarrier data communication systems that use a bit or byte level error correction mechanism. Further, it is applicable for any system where the modulation and demodulation are performed at the frame level. However, the ensuing description considers a multicarrier system employing IFFT and FFT for modulation and demodulation, respectively, and a Reed Solomon byte error correcting mechanism. Details about the Reed Solomon error correction code are given by Man Young Rhee in "Error Correcting Coding Theory," McGraw-Hill, International Editions, 1989 which is hereby incorporated by reference.

Figure 1:
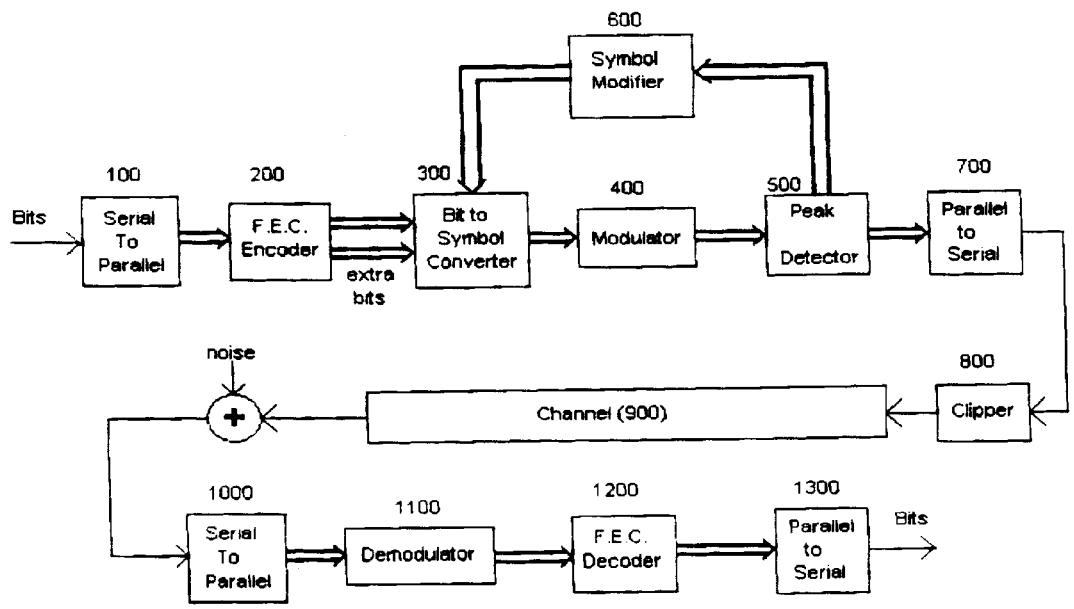
FIG. 1 is a block diagram of a typical multicarrier system that employs a forward error correction code.
Figure 2:
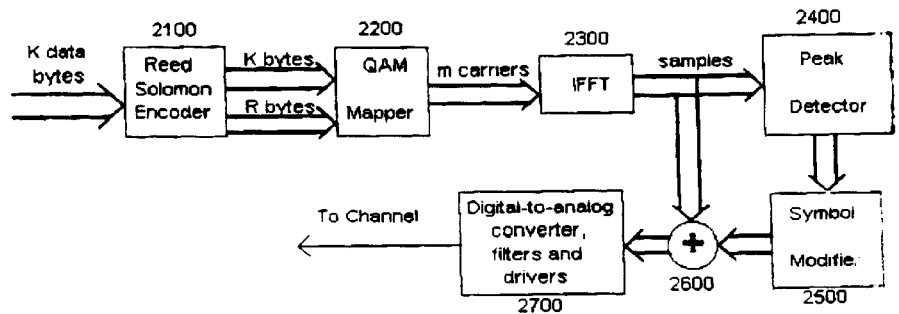
FIG. 2 is a block diagram of the present invention.

A block schematic of the proposed method is shown in FIG. 2. A Reed Solomon encoder 2100 adds R redundant check bytes for every block of K input data bytes to produce a frame of N=K+R bytes. The data frame of N bytes is then mapped to symbols in block 2200 and modulated using the IFFT block 2300. Assuming a multicarrier system of m carriers with Bi bits in carrier i, the data frame size (in bytes) N satisfies N*8=B1+B2+ . . . +Bm. In case of bit wise framing schemes, the sum of the bits need not be a multiple of 8. In a more general case, the encoded frame of size N may span more than one block of modulator output. In this case, the size of the input to the mapper is not the same as that of the input to the IFFT block.

The IFFT samples are passed through a peak detector 2400. The peak detection is carried out on the modulated samples using a predetermined threshold (or set of thresholds). The output of the peak detector activates the symbol modifier block 2500 whose output is added to the modulator output. This is finally passed through the Digital to Analog converter, filters and line drivers (represented in block 2700) and transmitted onto the channel.

The functions of peak detector and symbol modifier blocks are now explained in detail.

The Peak Detector

The inputs to the peak detector are M=2m samples of the IFFT. The peak detector uses a predesignated threshold T. Each IFFT sample is compared with the threshold and the indices of samples whose magnitude exceeds the threshold are stored along with the amount by which they violate the threshold. This data forms the input to the symbol modifier block.

Figure 3:
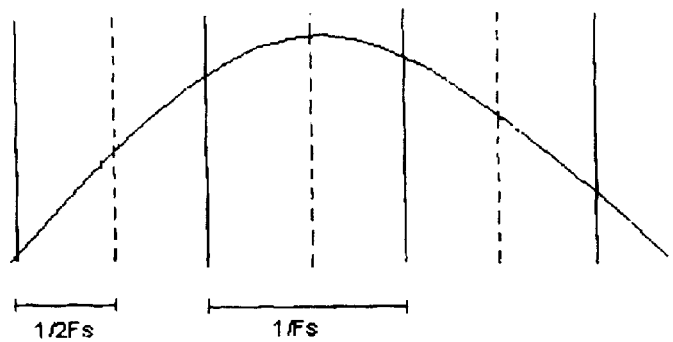
FIG. 3 explains the effect of sampling rate on peak detection.

More generally, the peak detector could also find out if several successive IFFT samples are exceeding another prespecified threshold T1. The motivation behind such an action is as follows: The peak detector works on a sampled response and the sampling instances may not capture the actual largest peak but some neighbouring smaller value. This problem can be avoided by increasing the sampling rate itself, in order to improve the possibility that actual peak values are detected. This problem is schematically depicted in FIG. 3. The sampled response corresponding to the normal sampling rate (fs) corresponds to the points of intersections of the continuous vertical lines with the continuous curve. It is seen that the actual peak value is missed for this case. If the sampling rate is doubled (to 2*fs), new samples would have resulted corresponding to the intersections of the continuous curve with the dotted vertical lines. It can be observed that one of the new points is nearer to the actual peak value.

Figure 7:
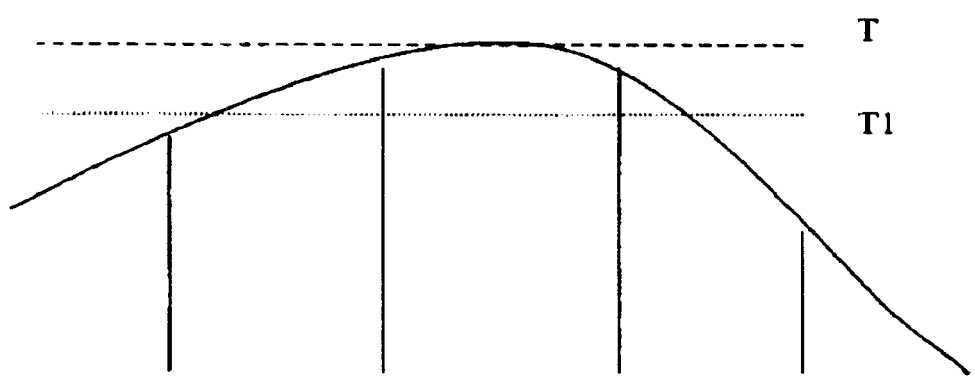
FIG. 7 demonstrates usage of different threshold for detection of contiguous peaks.

In actual practice, it may not be possible to increase the sampling rate since that induces extra computation overheads. A compromise solution in such cases would employ another threshold T1, possibly different from T, and look for cases where 2 or more contiguous samples cross this threshold. FIG. 7 depicts a case where 2 peaks exceed the threshold T1. It is possible to get a better approximation to an actual peak by performing simple interpolation using these points.

The symbol modifier is conveyed the value and location of the estimated peak(s) for which it needs to compensate.

The Symbol Modifier

This block determines the modification(s) to be made to the input symbols or the modulated samples such that the output of the symbol modifier reduces the overall PAR of the transmit signal. Below several embodiments are described, which have varying degrees of complexity. The clipping level is fixed based on the permissible bit error rate introduced by the transmitter module. In general the clipping probability for a given threshold is small. In such a case, the probability that more than one sample will be clipped in a frame is small compared to the probability of a single sample (peak) getting clipped.

First, a procedure is described that takes care of one peak in a frame. The procedure determines that subcarrier symbol which has the maximum effect on the peak. The symbol is then given a phase rotation to effect a peak reduction. It is possible that a new peak results by this procedure; the procedure may then be repeated for the new peak after removing the previously chosen subcarrier from the search.

When there is more than one peak, the procedure is carried out starting from the largest one. The pseudo code for the procedure is given below:

Procedure 1

1. For the largest peak occurring, say at location L, do steps 2–4.
2. Determine the subcarrier, which will result in the maximum effect on the given peak. For ease of understanding, let us consider a case where the subcarrier frequencies are given by 0*B, 1*B, 2*B . . . , m*B. The sampling rate is assumed to be M*B. For each subcarrier, determine effect E of the symbol on the output. For a complex input $X_i+jY_i$ at the ith subcarrier of the modulator, this is computed as follows. The effect of the ith subcarrier is given by $$E_i = X_i * \cos((2*\pi*L*i)/(M)) - Y_i * \sin((2*\pi*L*i)/(M))$$

3. Determine the subcarrier that has the maximum value of $R_i+E_i$,
   Where $R_i = \text{sqrt}(X_i*X_i + Y_i*Y_i)$.
4. Apply a phase correction P to the chosen subcarrier computed as follows:

$$P = -(2*\pi*L*i)/(M) - \text{atan}(Y_i/X_i)$$

$$(X_i + jY_i) \leftarrow (X_i + jY_i) * \exp(j*P)$$

Remove the chosen subcarrier that has been modified from the search space.
5. Repeat steps 1–4 if necessary.
6. Remodulate the changed symbols and transmit the modified samples.

Figure 4:
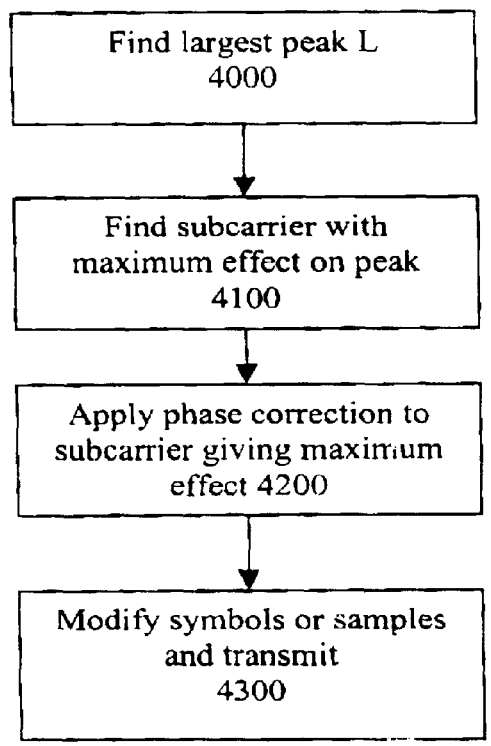
FIG. 4 depicts an iteration of Procedure 1.

One iteration of Procedure 1 is depicted in FIG. 4. To begin with, the largest peak is found (block 4000) and the subcarrier with the maximum effect on this peak is found (block 4100). The above described phase correction is applied to this subcarrier (block 4200) and the symbols or samples are modified and transmitted (block 4300).

In step 2 above, the expression for E corresponds to a conventional QAM modulation scheme in each subcarrier. If the modulation is performed using IFFT, the (M-i) the subcarrier will have the complex conjugate of the ith subcarrier symbol. In this case, the expression for E will have to be scaled by a factor of 2 (with the exceptions of the DC and Nyquist subcarriers).

Modifications to the procedure are now mentioned.

In step 3 above, $R_1+E_i$ could be approximated to $2*E_i$ in order to avoid the square root computation.

In step 4 above, the phase correction may result in an invalid symbol. In such a case, the nearest valid symbol could be chosen. This is required so that the receiver adaptation during data mode is unaffected.

A 180 degrees phase correction could be applied instead of the one computed in step 4. This may result in lower bit errors introduced in case of certain kind of bit to symbol mapping schemes. For e.g., in case of a constellation with even number of bits-per-symbol, a 180 degrees phase shift results in a valid symbol and introduces only two bit errors. This could result in a smaller loss in coding gain.

If the average power constraint can be relaxed, the amplitude of the subcarrier could also be varied to increase the extent of PAR reduction achieved.

Repeated application of the above procedure on a data frame results in a higher PAR reduction at the cost of coding gain. This allows the transmitter to tradeoff the amount of PAR reduction desired against coding gain.

Although the above procedure is computationally inexpensive, it may result in too many symbols being modified leading to unacceptable loss of coding gain. Thus, in a further embodiment, this situation is addressed. This procedure is as follows:

Procedure 2

1. Determine the peaks P1, P2, P3, . . . Pn (n<=M) at locations L1, L2 . . . Ln, respectively.
2. Determine the effects E of subcarrier on the largest peak. Calculate the phase correction as specified in 2, 3 and 4 of procedure 1 above. Determine the overall effect of the phase correction on all the other peaks as a sum (weighted or otherwise) of the individual effects. Choose the subcarrier that gives the greatest sum of effects.
3. Remove the chosen subcarrier that has been modified from the search space.
4. Repeat steps 1–3 if required.
5. Remodulate the changed symbols and transmit the modified samples.

Figure 5:
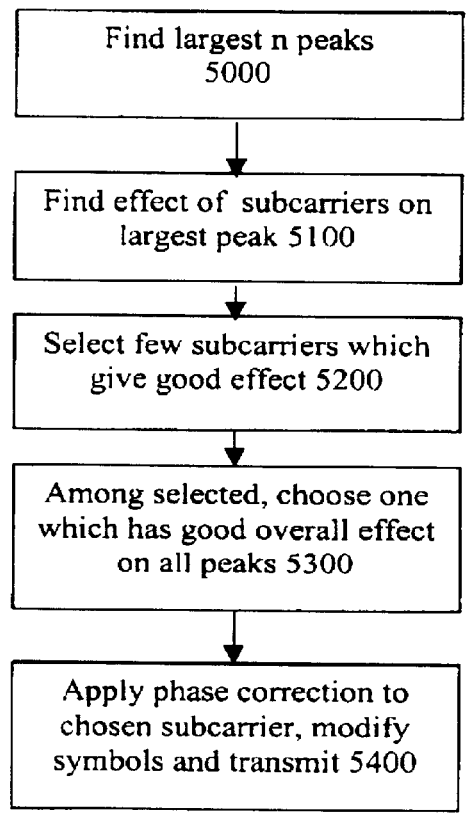
FIG. 5 describes Procedure 2.

Procedure 2 is depicted in FIG. 5. The largest n peaks are found (block 5000) and the effect of subcarriers on the largest peak determined (block 5100). Out of the subcarriers, few that give the maximum effect are selected (block 5200). The cumulative effect on the n peaks due to each subcarrier in the selected set is computed and the best of them chosen (block 5300). The phase correction is applied to this subcarrier, the modulated data modified and transmitted.

Here, instead of choosing the subcarrier with the greatest overall effect (effect E as defined in procedure 1), the subcarrier that gives the minimum sum of residual peaks is chosen. Here residual peak is defined as the amount by which a peak exceeds the threshold value.

Procedure 2 needs a search through all the subcarriers. In practice, the event of occurrence of more than two peaks is very low. The one peak case has already been dealt with. Accordingly, a procedure that can handle two peaks and does not need to search through all the subcarriers is now described. Thus, the above procedure needs to be applied only wherein there are more than two peaks, which occurs very rarely.

In case of two peaks, the search for the best subcarrier may be restricted to a subset of subcarriers as follows:

Procedure 3

1. Determine the distance D between the two samples i.e. the peaks occur at L1 and L1+D.
2. Compute the phase difference between the two peak locations for each subcarrier. The phase difference is calculated as:

$$P=(2*\pi*D*i)/(M)$$

Where,
i→subcarrier number,
M→Total samples in the frame.

3. If both peaks have the same sign, choose subcarriers that satisfy the following relation:

$$-\Delta<P<\Delta$$

Where,
$\Delta$ is a small angle between 0 and $\pi/2$. (A typical value of $\Delta$ could be $\pi/6$.)
For peaks with opposite signs, choose subcarriers that satisfy the relation:

$$\pi-\Delta<p<\pi+\Delta$$

4. Apply either procedure 1 or procedure 2 to the reduced set of subcarriers.

Figure 6:
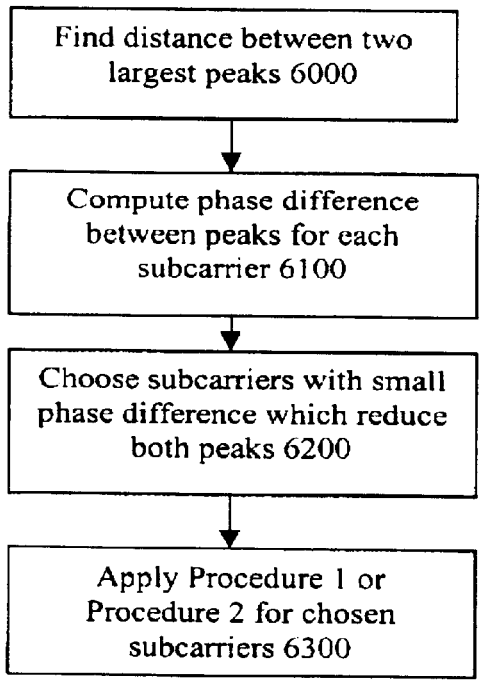
FIG. 6 is a block schematic of Procedure 3.

Procedure 3 is depicted in FIG. 6. The distance between the two large peaks is found (block 6000). The phase difference between the two peaks is computed for each subcarrier (block 6100). The carriers that have small phase difference (as indicated in Procedure 3) are chosen (block 6200) and either of the procedures 1 or 2 applied to this set (block 6300).

To minimize computation during procedure 3, the set of subcarriers for each value of D may be precomputed and stored.

The methods for choosing the subcarrier to be modified are generic: it can be applied to any scheme that modifies one or more subcarriers to effect a PAR reduction.

In all the procedures above, the amount of subcarrier symbols that could be modified will be limited by the error correcting capability of the encoder.

Apart from IFFT, any alternate means of frame (symbol) based QAM modulation may also be used. This could also include PAM and DPSK modulation.

The procedure can also be applied to any subset of the 2-dimensional constellation or multi-dimensional constellations.

The symbol modification can be applied to the phase or the amplitude or both. Also, the modules can be implemented in hardware or software in accordance with the present invention.

What is claimed is:

1. In a multi-carrier transmission system, a method of reducing peak power of a signal to be transmitted while minimizing coding errors introduced into the signal to be transmitted, comprising the steps of:

identifying a largest peak in magnitude occurring in a frame of the signal to be transmitted in the multi-carrier transmission system;

determining a subcarrier frequency that has a maximum effect on the identified peak wherein for each subcarrier in the signal to be transmitted determining an effect E on the peak wherein for a complex input signal $X_i+jY_i$, the effect E of an ith subcarrier is given by $E_i=X_i*\cos((2*\pi*L*i)/(M))-Y_i*\sin((2*\pi*L*i)/(M))$, where L is a location of the peak and M is a sampling rate;

determining the subcarrier having a maximum value of E; and applying a phase correction to the subcarrier frequency having the maximum effect on the identified peak to reduce the effect of the subcarrier on the identified peak.

2. The method of claim 1 wherein determining the subcarrier having a maximum value of E comprises:

determining the subcarrier that has the maximum value of $R_i+E_i$, where $R_i=\text{sqrt}(X_i*X_j+Y_i*Y_i)$.

3. The method of claim 1 wherein applying a phase correction to the subcarrier frequency comprises:

$$P=-(2*\pi*L*i)/(M)-\mathrm{atan}(Y_i/X_i),$$

$$(X_i+jY_i) \leftarrow (X_i+jY_i)*\exp(j*P),$$

where P represents the phase correction and j=sqrt(−1).

4. The method of claim 1 further comprising:

responsive to a peak having a power value exceeding a predetermined thresholds selecting a subcarrier having a next highest value of E as a subcarrier to be corrected; and applying a phase correction to the subcarrier having a next highest value of E to reduce the power value of the signal to be transmitted.

5. In a multi-carrier transmission system, a method of reducing peak power of a signal to be transmitted while minimizing coding errors introduced into the signal to be transmitted, wherein the signal to be transmitted has a plurality of peaks in a frame comprising the steps of:

determining peak magnitude values of the plurality of peaks at a plurality of locations in the frame of the signal to be transmitted;

identifying a largest peak in the signal to be transmitted responsive to the determined peak magnitude values;

determining an effect E for each subcarrier within the signal to be transmitted wherein for a complex input signal $X_i+jY_j$, the effect E of an ith subcarrier is given by $E_i=X_i*\cos((2*\pi*L*i)/(M))-Y_i*\sin((2*\pi*L*i)/(M))$, where L is a location of the peak and M is a sampling rate;

calculating a phase correction for each subcarrier within the signal to be transmitted;

determining a sum of effects value for each phase correction, the sum of effects value identifying an overall effect of the phase correction on the peak magnitude values of the other peaks;

selecting a subcarrier to be corrected as a subcarrier having a maximum sum of effects value; and applying the calculated phase correction for the subcarrier having a maximum sum of effects value to the subcarrier to be corrected.

6. The method of claim 5 wherein calculating a phase correction further comprises:

$$P=-(2*\pi*L*i)/(M)-\mathrm{atan}(Y_i/X_i),$$

$$(X_i+jY_i) \leftarrow (X_i+jY_i)*\exp(j*P),$$

where P represents the phase correction and j=sqrt(−1).

7. In a multi-carrier transmission system, a method of reducing peak power of a signal to be transmitted while minimizing coding errors introduced into the signal to be transmitted, where the signal to be transmitted has two peaks in magnitude within a frame, comprising the steps of:

determining a distance between the two peaks in magnitude;

computing a phase difference, P, between the two peaks for each subcarrier of the signal to be transmitted;

responsive to both peaks having a same sign value, selecting subcarriers to analyze that satisfy:

$$-\Delta<P<\Delta$$

where, $\Delta$ is a small angle between 0 and $\pi/2$;

determining an effect E for each selected subcarrier frequency within the signal to be transmitted;

determining a subcarrier frequency of the selected subcarrier frequencies that has a maximum effect on the identified peak; and applying a phase correction to the subcarrier frequency having the maximum effect on the identified peak to reduce the effect of the subcarrier frequency on the identified peak.

8. The method of claim 7 further comprising:

responsive to both peaks having an opposite sign value, selecting subcarriers for analysis that satisfy the relation:

$\pi-\Delta<P<\pi+\Delta$ where P represents a phase correction.

9. In a multi-carrier transmission system, a method of reducing peak power of a signal to be transmitted while minimizing coding errors introduced into the signal to be transmitted, where the signal to be transmitted has two peaks in magnitude within a frame, comprising the steps of:

determining a distance between the two peaks in magnitude;

computing a phase difference, P, between the two peaks for each subcarrier of the signal to be transmitted;

responsive to both peaks having a same sign value, selecting subcarriers to analyze that satisfy:

$$-\Delta<P<\Delta$$

where, $\Delta$ is a small angle between 0 and $\pi/2$;

determining an effect E of for each selected subcarrier within the signal to be transmitted;

calculating a phase correction for each selected subcarrier within the signal to be transmitted;

determining a sum of effects value for each phase correction, the sum of effects value identifying an overall effect of the phase correction on the peak values of the other peaks;

selecting a subcarrier to be corrected as the subcarrier having a maximum sum of effects value; and applying the calculated phase correction for the subcarrier to be corrected to the subcarrier to be corrected.

10. The method of claim 9 further comprising:

responsive to both peaks having an opposite sign value, selecting subcarriers for analysis that satisfy the relation:

$\pi-\Delta<P-\pi+\Delta$ where P represents a phase correction.

* * * * *